(12) United States Patent
Dwyer et al.

(10) Patent No.: US 7,018,053 B2
(45) Date of Patent: Mar. 28, 2006

(54) PROJECTOR

(75) Inventors: Dan Dwyer, Battle Ground, WA (US);
Susan Nakashima, Corvallis, OR (US);
Corrina Alison Beanor Hall, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/693,354

(22) Filed: Oct. 23, 2003

(65) Prior Publication Data

US 2005/0088631 A1    Apr. 28, 2005

(51) Int. Cl.
*G03B 21/14*    (2006.01)

(52) U.S. Cl. .................. 353/119; 353/101; 353/122

(58) Field of Classification Search .................. 353/10, 353/30, 31, 39, 42, 43, 61, 100, 110, 115, 353/119, 122, 101; D16/225; 349/7; 348/739, 348/744
See application file for complete search history.

(56) References Cited

U.S. PATENT DOCUMENTS

| | | | |
|---|---|---|---|
| 2,168,799 A * | 8/1939 | Korkosz et al. ............. 434/286 |
| 2,753,759 A | 7/1956 | Smith |
| 3,632,197 A | 1/1972 | Shelton |
| 3,925,917 A | 12/1975 | Concha |
| 4,457,610 A | 7/1984 | Kawazoe |
| 4,468,105 A | 8/1984 | Montgomery |
| RE32,648 E | 4/1988 | Montgomery |
| 4,859,053 A | 8/1989 | Nicolas |
| 5,253,000 A | 10/1993 | Stoeckner |
| 5,295,056 A | 3/1994 | Peck |
| 5,459,539 A * | 10/1995 | Yamamoto .................. 353/119 |
| 5,477,283 A | 12/1995 | Casey |
| 5,505,000 A | 4/1996 | Cooke |
| D378,096 S * | 2/1997 | Harada ....................... D16/225 |
| 5,788,355 A * | 8/1998 | Na .............................. 353/101 |
| 5,806,950 A | 9/1998 | Gale et al. |
| D429,175 S | 8/2000 | Ha |
| D449,634 S | 10/2001 | Gotham et al. |
| D449,635 S | 10/2001 | Gotham et al. |
| D449,636 S | 10/2001 | Gotham et al. |
| D452,520 S | 12/2001 | Gotham et al. |
| 6,328,269 B1 | 12/2001 | Krautloher |
| 6,354,725 B1 | 3/2002 | Simon |
| 6,379,012 B1 | 4/2002 | Enochs et al. |
| D456,831 S | 5/2002 | Mori et al. |
| D464,073 S | 10/2002 | Nakaumura |
| D468,335 S | 1/2003 | Goto et al. |
| D489,390 S * | 5/2004 | Ohshima et al. ........... D16/225 |
| 6,769,778 B1 * | 8/2004 | Lloyd .......................... 353/103 |
| 2001/0000300 A1 | 4/2001 | Haile-mariam |
| 2001/0048464 A1 | 12/2001 | Barnett |
| 2002/0080332 A1 | 6/2002 | Jones et al. |
| 2002/0101571 A1 | 8/2002 | Panasewicz et al. |
| 2002/0105620 A1 | 8/2002 | Goulden et al. |

(Continued)

FOREIGN PATENT DOCUMENTS

| | | |
|---|---|---|
| DE | 4210440 A1 | 10/1993 |
| EP | 000735312 A1 | 3/1996 |
| GB | 2355080 * | 4/2001 |
| JP | 2002277957 | 9/2002 |

*Primary Examiner*—W. B. Perkey
*Assistant Examiner*—Rochelle Blackman

(57) ABSTRACT

A projector includes circuitry configured to generate an image; a lens for projecting the image; a housing for the circuitry; and a mechanism for moving the lens with respect to the housing or with respect to a viewing surface to direct a projected image in a desired direction.

32 Claims, 12 Drawing Sheets

U.S. PATENT DOCUMENTS

| | | |
|---|---|---|
| 2002/0169817 A1 | 11/2002 | Eves et al. |
| 2003/0017846 A1 | 1/2003 | Estevez et al. |
| 2003/0061400 A1 | 3/2003 | Eves et al. |
| 2003/0081561 A1 | 5/2003 | Hsiao |
| 2004/0125343 A1* | 7/2004 | Hara et al. .................... 353/57 |
| 2005/0012909 A1* | 1/2005 | Kokin et al. ................ 353/119 |

* cited by examiner

PROJECTOR

BACKGROUND

The projection of video and/or still images onto a viewing surface such as a wall, screen, door, or the like is an increasingly popular form of home entertainment. As projection systems become more affordable, they will become even more commonplace in homes, schools, and other venues for watching video, viewing still images, and playing video games.

It is often desirable to aim a projector so that the projected image can appear on different viewing surfaces that are in various directions from the projector. For example, in one instance it may be desirable to aim a projector at a wall and in another instance it may be desirable to aim the projector at a ceiling. However, current projectors are usually fixed in place and incapable of being aimed in multiple directions.

Furthermore, many existing projectors are large and obtrusive, especially in a home environment. A physically large projector is not desirable in small areas such as a living room because such projectors are aesthetically unpleasing as well as difficult to store when not in use.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A projector with a lens that is easily aimed is described herein. In the following description, for purposes of explanation, numerous specific details are set forth in order to provide a thorough understanding of the present system and method. It will be apparent, however, to one skilled in the art that the system and method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
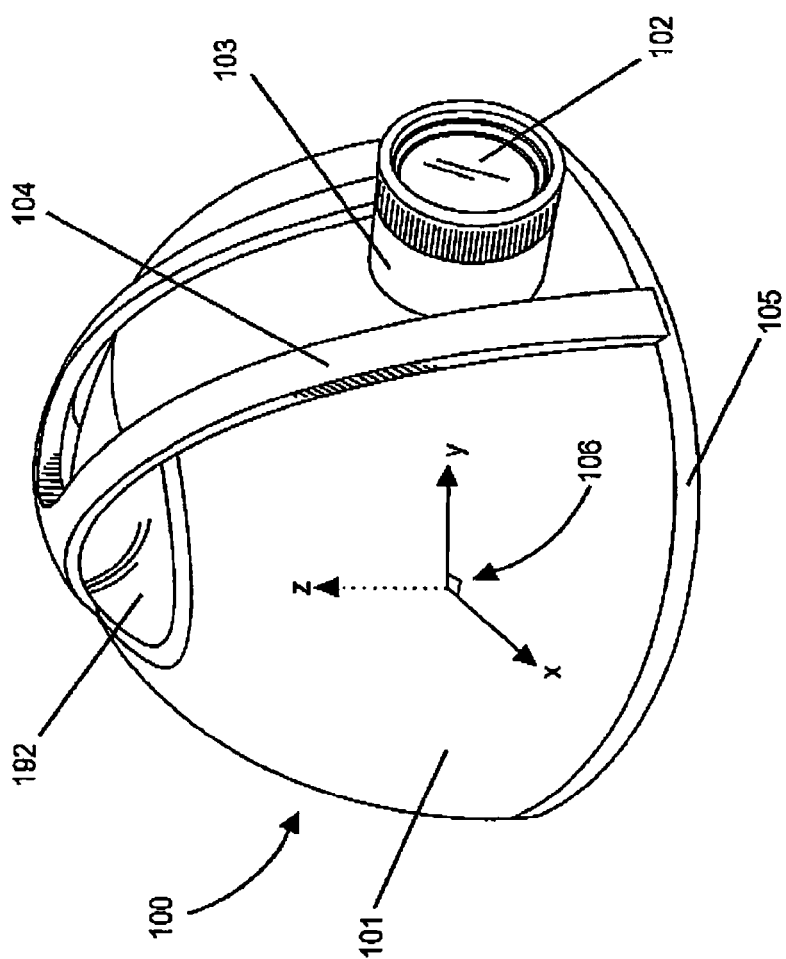
FIG. 1 illustrates an exemplary projector that may be easily aimed and focused in a number of directions according to one exemplary embodiment.

FIG. 1 illustrates an exemplary projector (100) that may be easily aimed and focused in a number of different directions. As referred to hereafter and in the appended claims, the term "projector" refers to any display device that projects video or images onto a viewing surface. The exemplary projector (100) of FIG. 1 comprises a housing (101), a lens (102), a lens tube (103), a lens track (104), and a swivel base (105). Each of these components will now be explained in more detail.

As shown in FIG. 1, the housing (101) may be in the shape of a hemisphere. The hemispherical shape allows the lens (102) to be vertically translated, as will be explained below. However, the shape of the housing (101) is in no way restricted to a hemispherical shape. For example, in alternative embodiments, the housing (101) may be in the shape of an ellipsoid or even a cubic box. The housing (101) both contains and protects the internal components (not shown) of the projector (100). The internal components may include, but are in no way limited to, a light source and an image medium. Light emanating from the light source is directed toward the lens (102) through the image medium, resulting in a projection of the image on the image medium through the lens and onto a viewing surface at which the projector (100) is aimed. The image medium may be, for example, a slide, film or an electronic display device that is driven by electronic image data. The housing (101) may be injection molded from an impact resistant polymer, according to one embodiment.

As described, the projector (100) of FIG. 1 also comprises a lens (102) through which an image or series of images is projected from the image medium onto a viewing surface. The lens (102) may be disposed in a lens tube (103) and is located at or near the end of the lens tube (103). As shown in FIG. 1, the lens tube (103) may be cylindrical in shape and is attached to the housing (101). The lens tube (103) may be threaded into engagement with the housing (101) in such a manner that the focal length between the image medium and the lens (102) can be adjusted within predetermined limits by rotation of the lens tube (103).

As shown in FIG. 1, a lens track (104) is provided along which the lens (102) and the lens tube (103) can be translated. This allows the lens (102) to be aimed at any angle above an x-y plane that is coincident with the base of the housing (101). A reference x, y, z coordinate system (106) is shown in FIG. 1, the z axis being vertical to the horizontal x-y plane. The lens tube (103) may be translated along the lens track (104) so that the lens (102) is pointing at any angle of inclination between 0 and 90 degrees, where 0 degrees corresponds to a direction parallel with the x-y plane (i.e., the horizontal plane) and 90 degrees corresponds to a direction parallel to the z-axis and perpendicular to the x-y plane.

Figure 2:
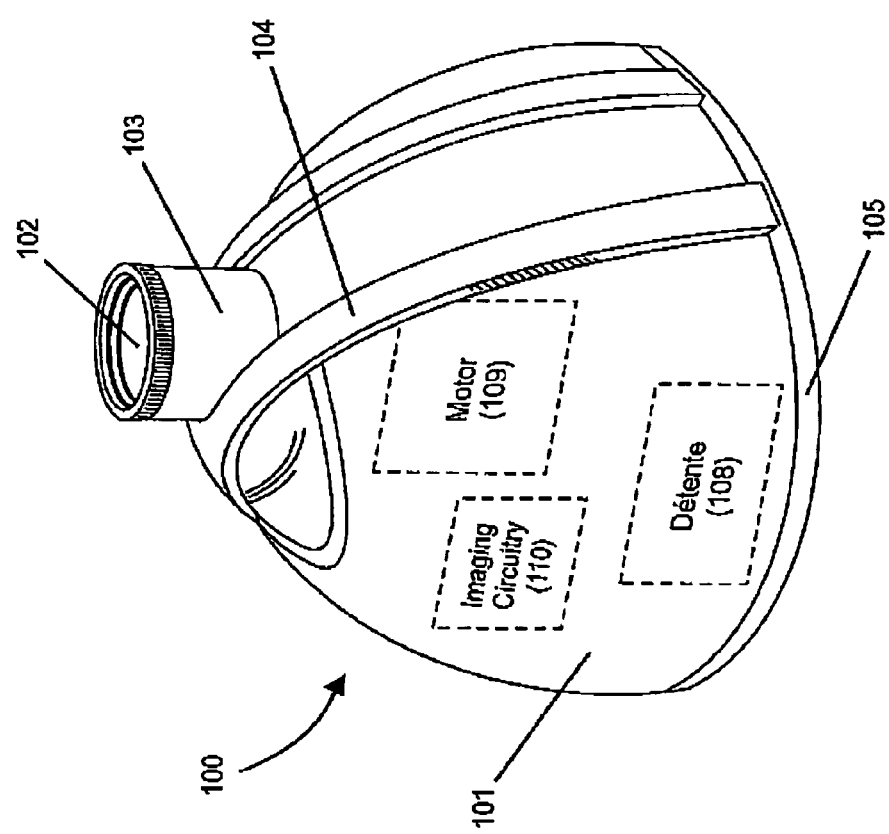
FIG. 2 illustrates a projector with a lens tube that has been translated to point at approximately a 90 degree angle of inclination according to one exemplary embodiment.

For example, in FIG. 1, the lens tube (103) is positioned to point approximately at a 0 degree angle of inclination. In comparison, FIG. 2 shows a projector (100) with a lens tube (103) that has been translated to point at approximately a 90 degree angle of inclination. In an alternative embodiment (not shown), the lens track (104) may arch completely over the housing (101) to that the lens tube (103) may be translated along the lens track (104) to point in any angle of inclination between 0 and 180 degrees with respect to the horizontal plane (x-y plane).

As shown in FIG. 1, the lens track (104) may be a structure that is externally coupled to the housing (101) to allow the lens tube (103) to slidably translate along the track (104), according to one embodiment. However, in an alternate embodiment, the lens track (104) may be integrated into the housing (101).

The lens tube (103) may be manually translated along the lens track (104), according to one embodiment. In an alternative embodiment, the projector (100) may be configured to automatically translate the lens tube (103) to a pre-determined position. In yet another alternative embodiment, the lens tube (103) may be motorized, e.g., with motor (109, FIG. 2), so that a user may translate the lens tube (103) along the lens track (104) by operating controls on the projector (100) or on a remote control unit.

During and after translation of the lens (102) and lens tube (103), the internal light source and image medium must remain optically coupled to the lens (102) so that the projector (100) can function properly. There are several possible ways to accomplish this. For example, the image medium and, perhaps, the light source may be disposed on a moving platform coupled to the lens tube (103) so that the image medium is moved with the lens tube (103) and remains optically coupled to the lens (102) at all times. Alternatively, a system of mirrors may be employed to direct the projected image from the image medium through the lens (102) irrespective of the position of the lens tube (103) along the lens track (104). Finally, a flexible optical conduit, such as a fiber optic cable, may be used to transmit the projected image from the image medium to the lens (102) irrespective of the position of the lens tube (103) along the lens track (104).

FIG. 1 also shows that the housing (101) may be mounted on top of a swivel base (105). The swivel base (105) allows the projector (100) to swivel 360 degrees about a central axis such that the lens (102) may be aimed in any direction in the x-y plane. Thus, if the projector (100) is located in the middle of a room, it can be easily swiveled in any direction so as to allow the lens (102) to point to a viewing surface on any of the walls in the room.

As shown in FIG. 1, the swivel base (105) may be circular and of the same surface area as the bottom of the housing (101). However, the sizing and the circular shape are exemplary only. The swivel base (105) may be of any shape and size so long as it allows the projector (100) to swivel in the x-y plane. The projector (100) may also comprise a mechanism (not shown) for locking the projector (100) in place once it is swiveled to a desired location. Alternatively, a detente mechanism (108, FIG. 2) can be used to prevent rotation of the projection on the base (105) unless a minimum amount of force is applied to overcome the detente (108). As before, the rotation of the projector (100) on the base (105) can be accomplished manually or can be motorized, e.g., with motor (109), and controlled with controls on the projector (100) itself or on a remote control unit.

Figure 3:
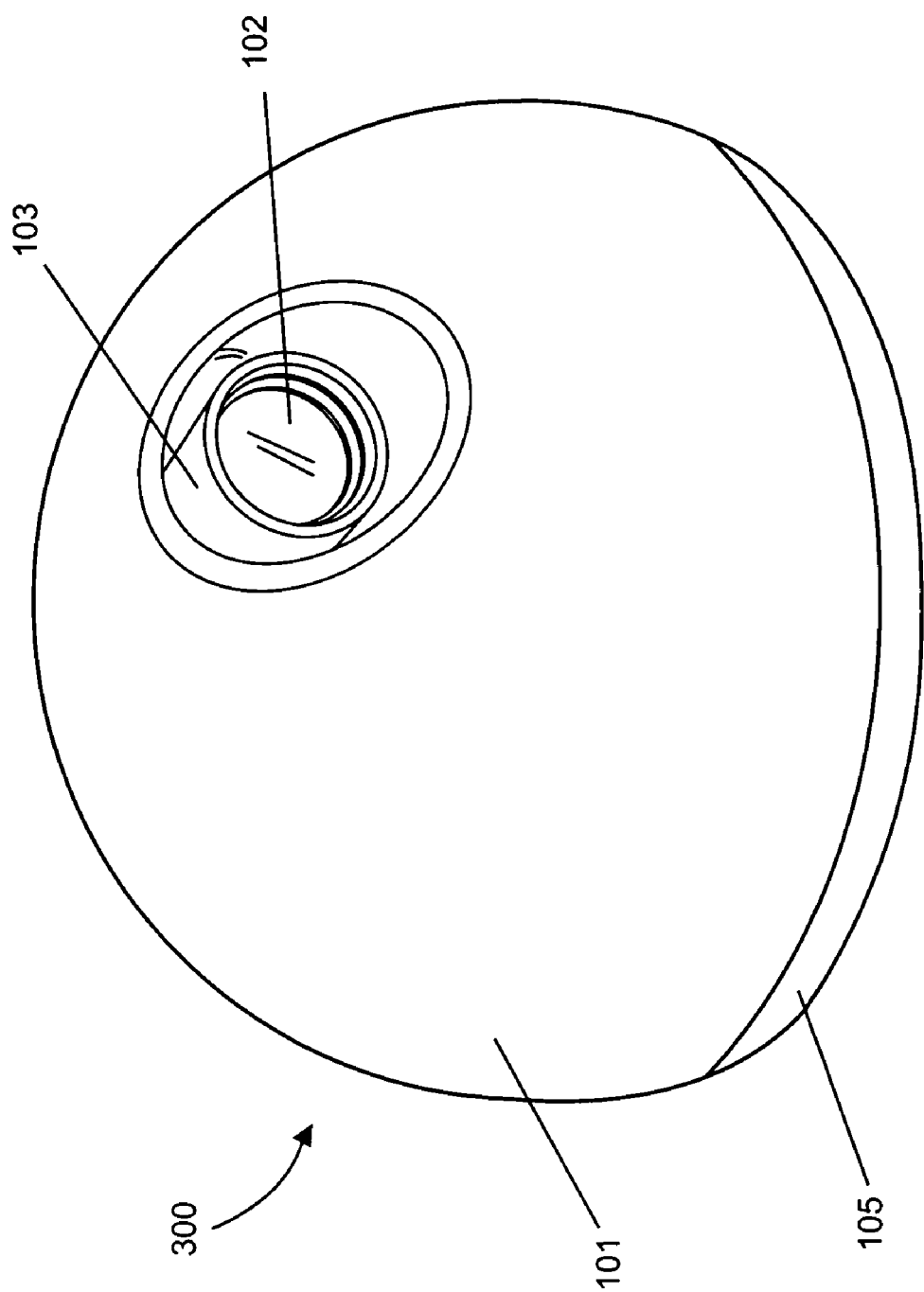
FIG. 3 illustrates a projector comprising a swivel base but not a lens track according to one exemplary embodiment.

Thus, a projector with a swivel base (105) and a lens track (104) as described in connection with FIG. 1 may be aimed in any desired radial direction contained in the projector's hemispherical region. It is important to note that although the projector (100) shown in FIG. 1 comprises both a swivel base (105) and a lens track (104), various embodiments of the projector described herein may only have a swivel base (105) or may only have a lens track (104). For example, a projector (300) in FIG. 3 comprises a swivel base (105) but not a lens track (104). Thus, the lens tube (103) of the projector (300) in FIG. 3 is fixed and cannot be translated so that the lens (102) points in any angle above the x-y plane. The projector (300) of FIG. 3 or any other projector that only swivels at its base may be used in instances where it is not desirable to adjust the vertical aim of the lens (102).

Figure 4:
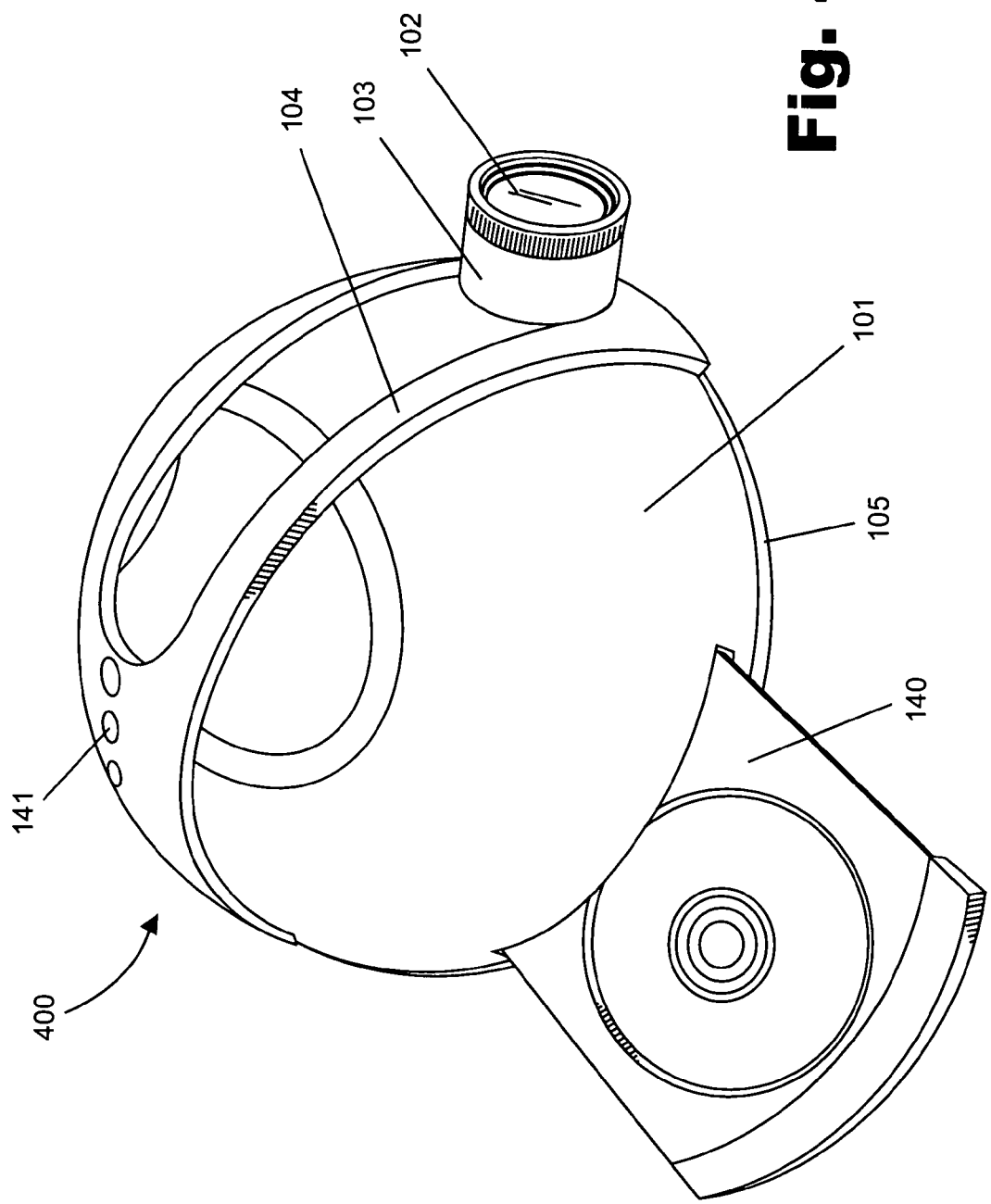
FIG. 4 illustrates that a projector comprising several optional components according to one exemplary embodiment.

FIG. 4 illustrates a projector (400) comprising several optional components, according to an exemplary embodiment. The projector (400) in FIG. 4 is similar in appearance to the projector (100) of FIG. 1. It will be understood by one skilled in the art that the optional components described in connection with FIG. 4 may be a part of any of the projectors described herein. As shown in FIG. 4, the projector (400) may further comprise an optical disc drive (140) and be configured to play digital versatile discs (DVDs), compact discs (CDs), or video game discs. The projector (100) may also further comprise a number of function controls (141). These function controls (141) may be in the form of buttons, as shown in FIG. 4, and may control power, volume, viewing options, projection angle and orientation and other functions. The projector (400) may also have a port (not shown) for a network cable and/or a connection for a personal computer. The projector (400) may be battery operated, plugged into a wall outlet or powered by some other means. The above-mentioned optional components are merely examples of many optional components that may be part of the projector (400).

Figure 5:
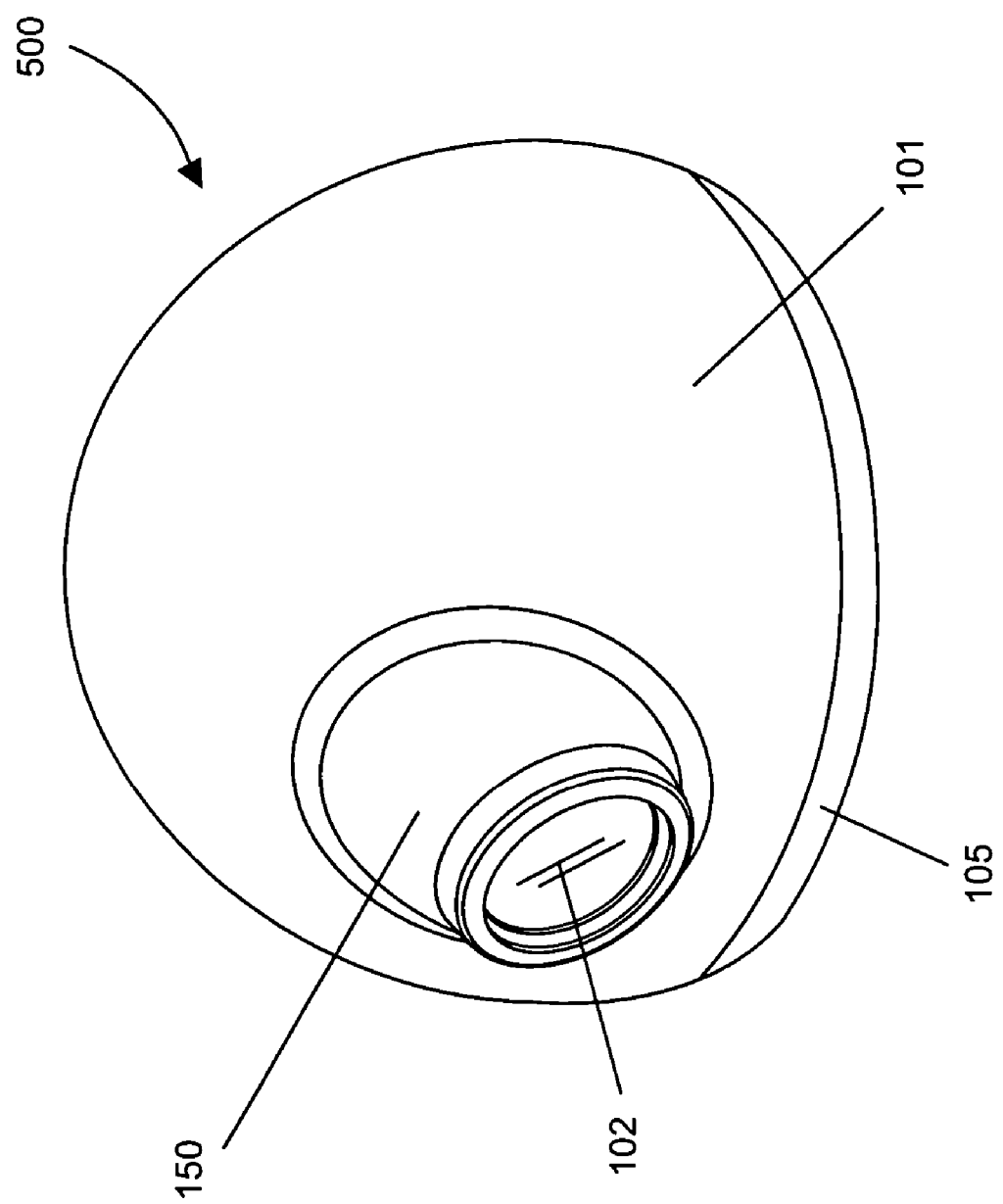
FIG. 5 illustrates a projector comprising a swivel lens tube according to one exemplary embodiment.

FIG. 5 illustrates an embodiment wherein a projector (500) comprises a swivel lens tube (150) rather than a lens tube track (104; FIG. 1) as illustrated in FIG. 1. The lens (102) is associated with the swivel lens tube (150) and is located at or near the end of the swivel lens tube (150). The swivel lens tube (150) allows a user to make small adjustments to the horizontal and vertical aim of the lens (150). The swivel lens tube (150) will now be explained in further detail.

As shown in FIG. 5, the swivel lens tube (150) is coupled to the housing (101) in a manner that gives the swivel lens tube (150) a horizontal and vertical range of motion about a central axis normal to the lens (102). The range of motion of the swivel lens tube (150) is limited only by the structure of the housing (101). In one embodiment, the swivel lens tube (150) may be horizontally swiveled from side to side so that the lens (102) may be aimed at different horizontal viewing angles with reference to the forward-pointing position of the swivel lens tube (150) shown in FIG. 5. The degree of the horizontal viewing angle is limited by the housing's shape and structure. In other words, the swivel lens tube (150) may be horizontally swiveled to a given side until the structure of the housing (101) prevents the swivel lens tube (150) from being further swiveled in that direction. An exemplary, but not exclusive, horizontal range of motion for the swivel lens tube (150) may be 45 degrees to the left and to the right with reference to the forward-pointing position of the swivel lens tube (150). Other horizontal ranges of motion may also be possible depending on the particular projector (500) that is being used.

Likewise, the swivel lens tube (150) may be vertically swiveled up and down so that the lens (102) may be aimed at different angles of inclination with respect to the x-y plane of which the perpendicular position of the swivel lens tube (150) is a part. An exemplary, but not exclusive, vertical range of motion of the angle of inclination for the swivel lens tube (150) may be 60 degrees up and 60 degrees down with reference to the x-y plane of which the perpendicular position of the swivel lens (150) is a part. Other vertical ranges of motion may be possible depending on the particular projector (500) that is being used.

Similar to the embodiments mentioned above, the swivel lens tube (150) may also be spherical in shape, as shown in FIG. 5, or of some other shape that allows the swivel lens tube (150) to swivel about a central axis. The projector (500) of FIG. 5 may have any of the additional components and/or features as described in connection with FIG. 4.

Figure 6:
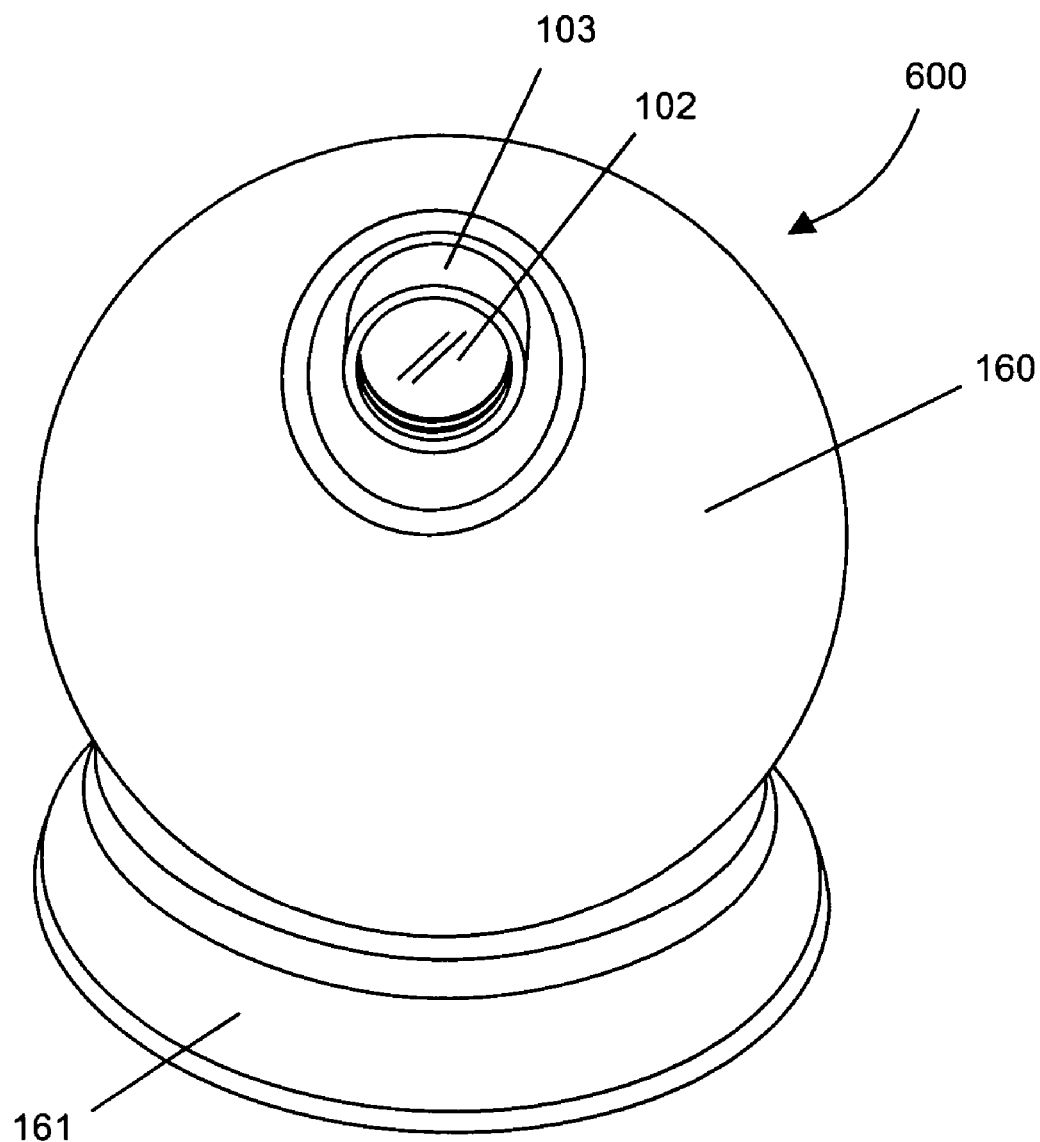
FIG. 6 illustrates a projector comprising a spherical housing according to one exemplary embodiment.

FIG. 6 illustrates an alternative embodiment wherein the projector (600) comprises a spherical housing (160) instead of a hemispherical housing (101; FIG. 1). The spherically shaped projector (600) may also be easily aimed and focused in a number of directions. As shown in FIG. 6, the spherical housing (160) is associated with a concave base (161). The concave base (161) may be, but is not limited to, the shape of a bowl. In one embodiment, the spherical housing (160) is not permanently attached to, but merely rests in, the concave base (161). The projector (600) further comprises a fixed lens tube (162) associated with the spherical housing (160). The fixed lens tube (162) is not movable in relation to the spherical housing (160). Thus, the projector (600) is aimed by maneuvering the entire spherical housing (160) with respect to the concave base (161), as will be described below.

Figure 7:
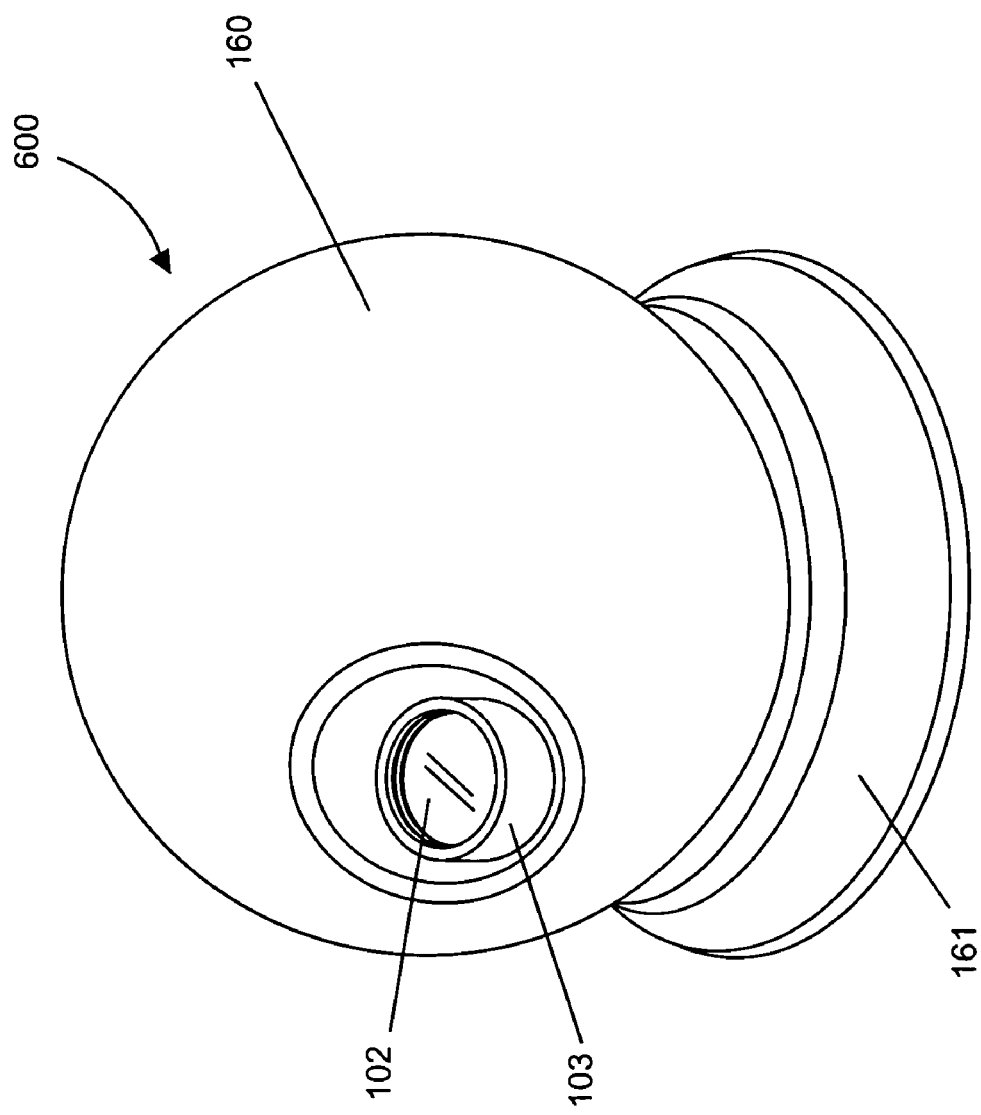
FIG. 7 illustrates a projector with a spherical housing that has been positioned in a concave base such that a lens is aimed in a vertical direction according to one exemplary embodiment.

The present configuration as shown in FIG. 6 does not permanently attach the spherical housing (160) to the concave base (161), which allows the projector's lens (102) to be easily aimed in a desired direction by maneuvering and positioning the spherical housing (160) in the concave base (161) in a manner such that the lens (102) is pointing in the desired direction. For example, the projector lens (102) is pointing in a horizontal direction in FIG. 6. FIG. 7 shows the lens (102) aimed in a vertical direction by positioning the spherical housing (160) disposed in the concave base (161) in a manner such that the lens (102) is pointing upwards. In one embodiment, the projector (100) further comprises a mechanism for locking the projector (100) in place in the concave base (161) once the lens (102) is pointing in the desired direction.

Figure 8:
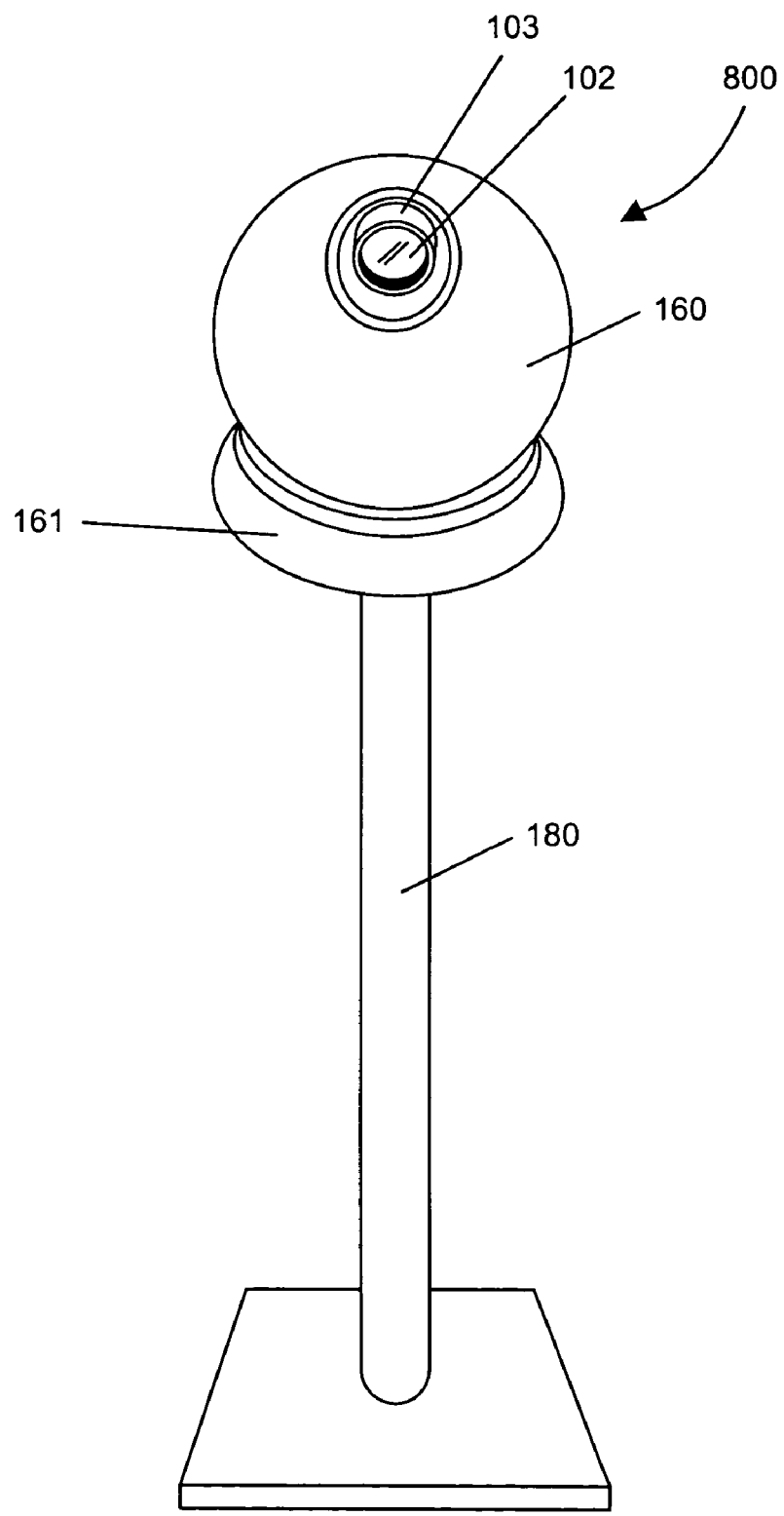
FIG. 8 illustrates a projector that is connected to a vertical stand for vertical positioning of the projector according to one exemplary embodiment.

The projectors of FIGS. 1–7 may be placed on top of a table, on a floor, or on some other suitable flat surface. FIG. 8 shows that a projector (800) may also be connected to, or placed on, a vertical stand (180) for vertical positioning of the projector (800). For illustrative purposes only, the projector (800) is a spherical projector similar to the spherical projector (600) of FIG. 6. The vertical stand (180) extends from a bottom surface of the concave base (161). The vertical stand (180) may be adjustable in height so as to allow a user to adjust the vertical position of the projector (800).

Figure 9:
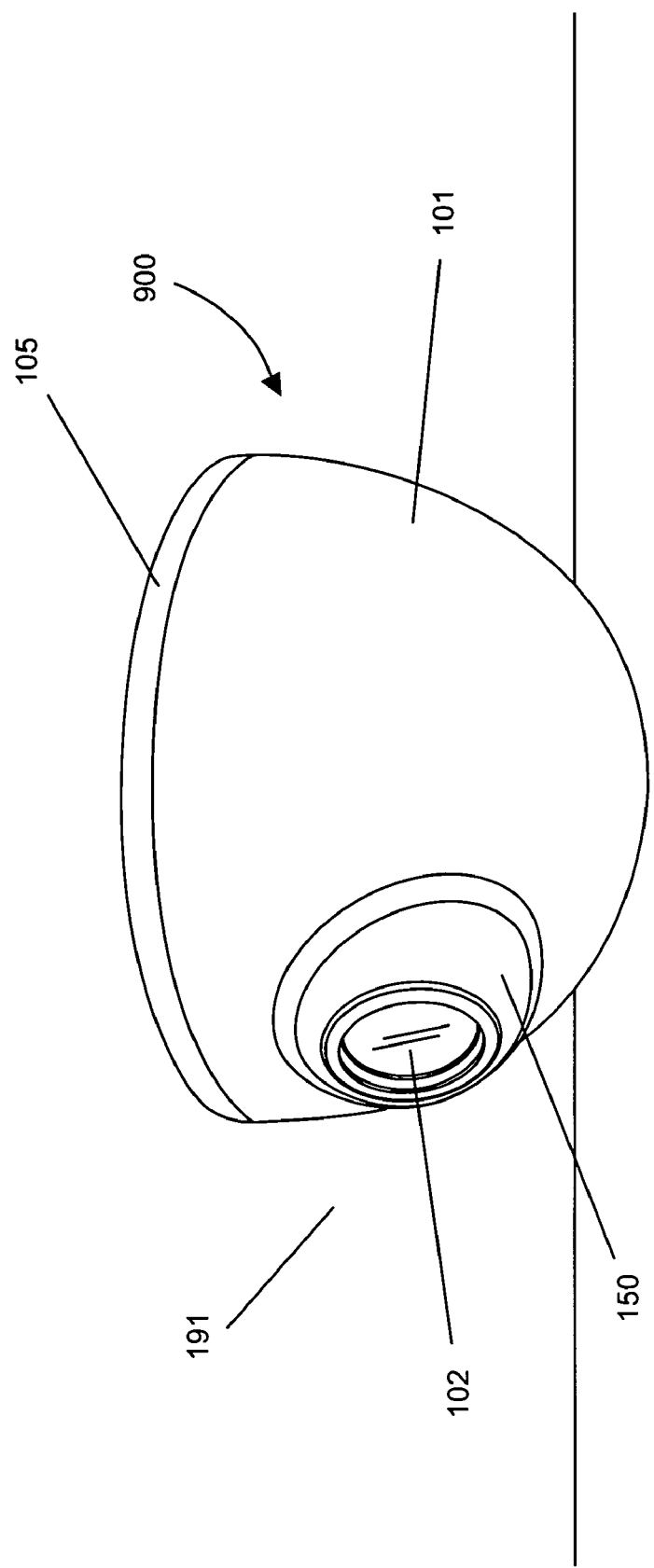
FIG. 9 illustrates an exemplary ceiling projector that may be easily aimed according to one exemplary embodiment.

FIG. 9 illustrates a projector (900) that is attached to a ceiling (191) and used as a ceiling projector, according to an exemplary embodiment. A projector that may be attached to a ceiling will be described for explanatory purposes only. However, as will be recognized by one skilled in the art, the ceiling projector (900) may alternatively be attached to a wall or some other structure in a building, home, or outdoor unit. Thus, the term "ceiling" will be used hereafter and in the appended claims, unless otherwise specifically denoted, to refer to any ceiling, wall, or other structure in a building, home, or outdoor unit. The ceiling projector (900) may be similar in design and function to one or more of the projectors described herein. Ceiling projectors are unobtrusive in many settings and are a popular form of projecting an image onto a viewing surface. FIG. 9 shows that, like the exemplary projectors of FIGS. 1–5, an exemplary ceiling projector (900) comprises a swivel base (105), a lens (102), a lens tube (103), and a hemispherical housing (101). The ceiling projector (900) is similar in appearance to the projector (500) of FIG. 5. However, the ceiling projector (900) may also be similar to any of the other above-described projector designs, according to various exemplary embodiments.

Rather than being placed on a table, floor, or vertical stand, the ceiling projector's swivel base (105) is attached to a ceiling (191), as shown in FIG. 9. The swivel base (105) allows the projector (900) to swivel 360 degrees about a central axis such that the lens (102) may be aimed in any direction in the x-y plane. Thus, if the projector (900) is located in the middle of a room, it can be easily swiveled in any direction so as to allow the lens (102) to point to a viewing surface on any of the walls in the room. The ceiling projector (900) is configured such that that the image projected through the lens (102) is properly oriented against the viewing surface.

Like the projector (500) of FIG. 5, the projector (900) may have a swivel lens tube (150) coupled to the housing (101) in a manner that gives the swivel lens tube (150) a horizontal and vertical range of motion about a central axis limited only by the geometry of the housing (101). The operation of the swivel lens tube (150) is explained in connection with FIG. 5 and will not be repeated here. In an alternative embodiment that is not shown, instead of having a swivel lens tube (150), the projector (900) may be similar to the projector (100) of FIG. 1 and have a lens track (104; FIG. 1) along which a lens tube (103; FIG. 1) may slidably translate. In yet another alternative embodiment, the projector (900) may have a swivel base (105) but not a movable lens tube.

Figure 10:
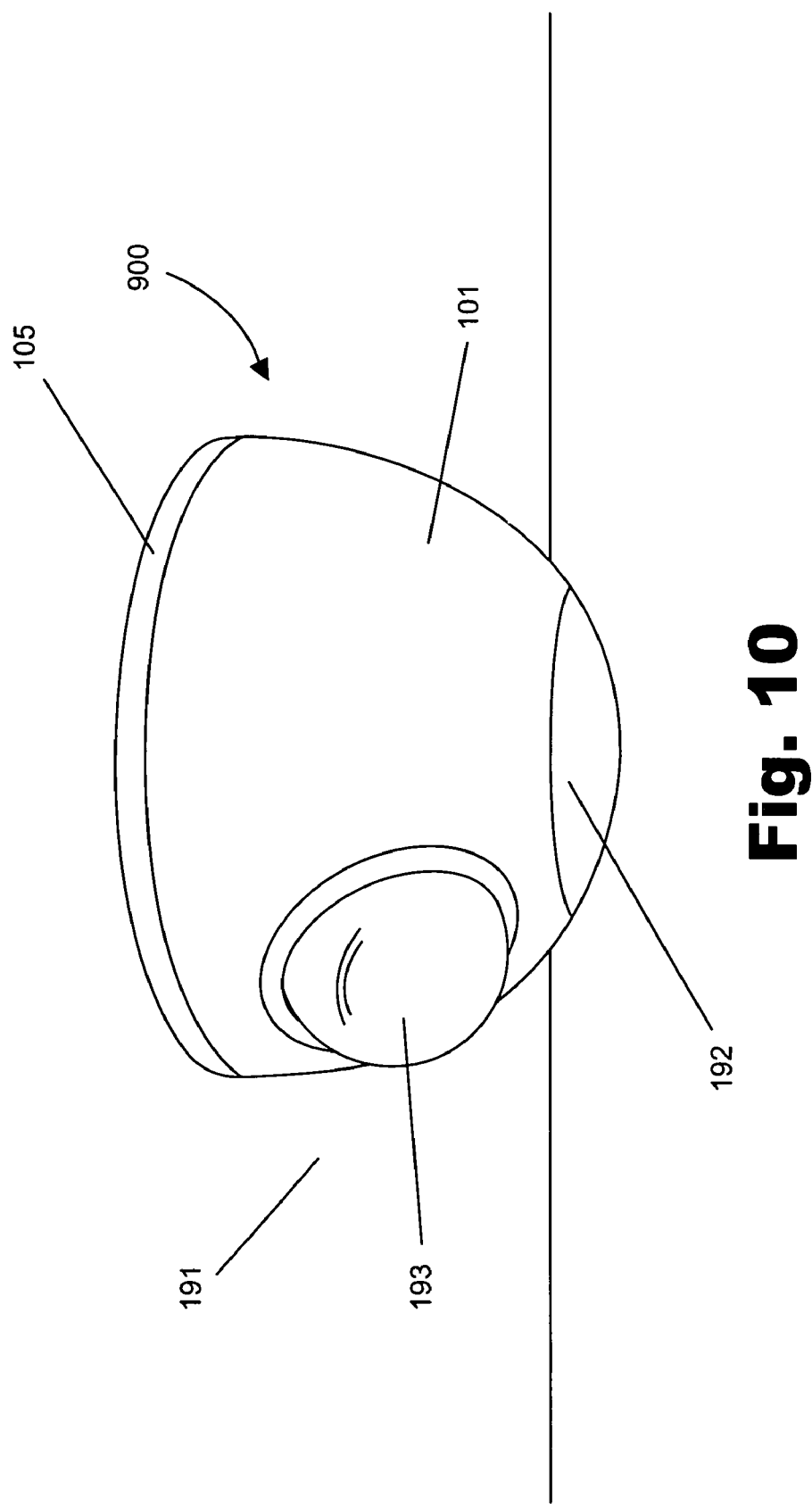
FIG. 10 illustrates a ceiling projector comprising additional components and features according to one exemplary embodiment.

FIG. 10 illustrates that the ceiling projector (900) may further comprise additional components and features, according to an exemplary embodiment. For example, in one embodiment the ceiling projector (900) may further comprise a light (192) for illuminating a room. The light (192) could be controlled by light switch, a remote control, or by some other mechanism and could be used to illuminate a room or some other area in which the ceiling projector (900) is located. The aim of the ceiling projector (900) may also be controlled by a remote control in some embodiments.

In another embodiment, the ceiling projector (900) may further comprise a lens cover (193) that covers the lens (102) when the lens is not in use. The lens cover (193) may automatically cover the lens (102) upon power down or stand by mode of the projector (900). Although the light (192) and lens cover (193) are described in connection with the ceiling projector (900), it will be understood by one skilled in the art that these additional features and structures may be implemented into any of the projectors described herein.

Figure 11:
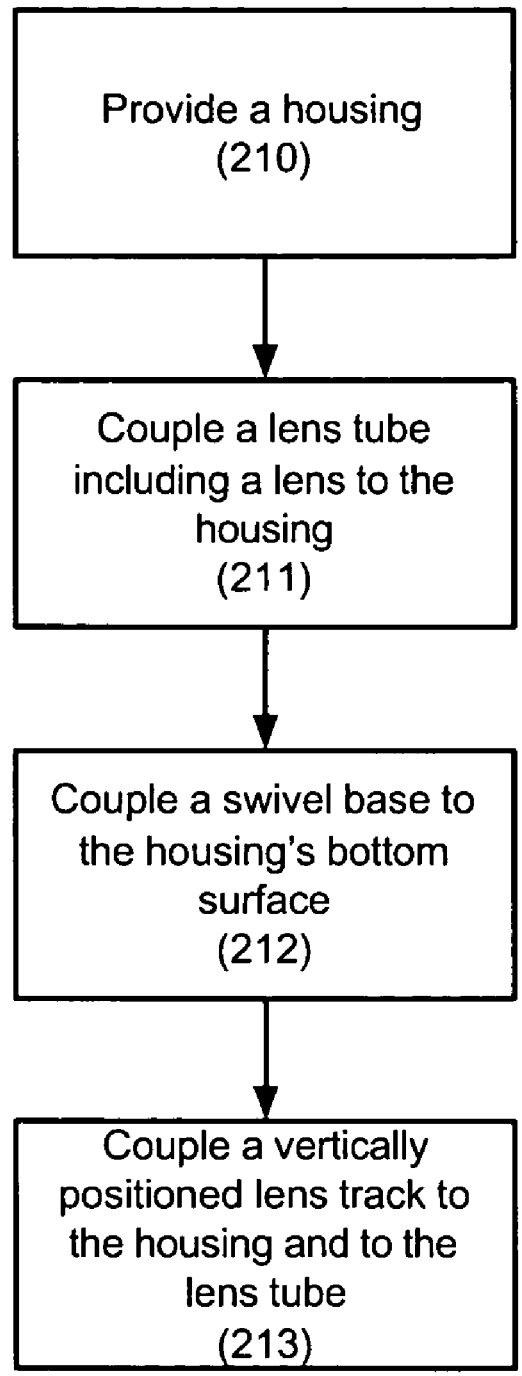
FIG. 11 is a flowchart illustrating an exemplary, but not exclusive, process of making a projector that is easily aimed according to one exemplary embodiment.

FIG. 11 is a flowchart illustrating an exemplary, but not exclusive, process of making a projector that is easily aimed as described herein. First, a housing is provided or formed (step 210). The housing houses circuitry (110, FIG. 1) that is used to generate an image that is to be displayed on a viewing surface. The housing includes a bottom surface. Next, a lens tube is coupled to the housing (step 211). The lens tube includes a lens that is configured to focus the image on the viewing surface. A swivel base is then coupled to the bottom surface of the housing (step 212). The lens maybe aimed in any direction in a horizontal plane by swiveling the housing on the swivel base.

The flowchart of FIG. 11 also shows that a vertically positioned lens track may be coupled to the housing and to the lens tube (step 213) so that the lens may be aimed in a vertical direction.

Figure 12:
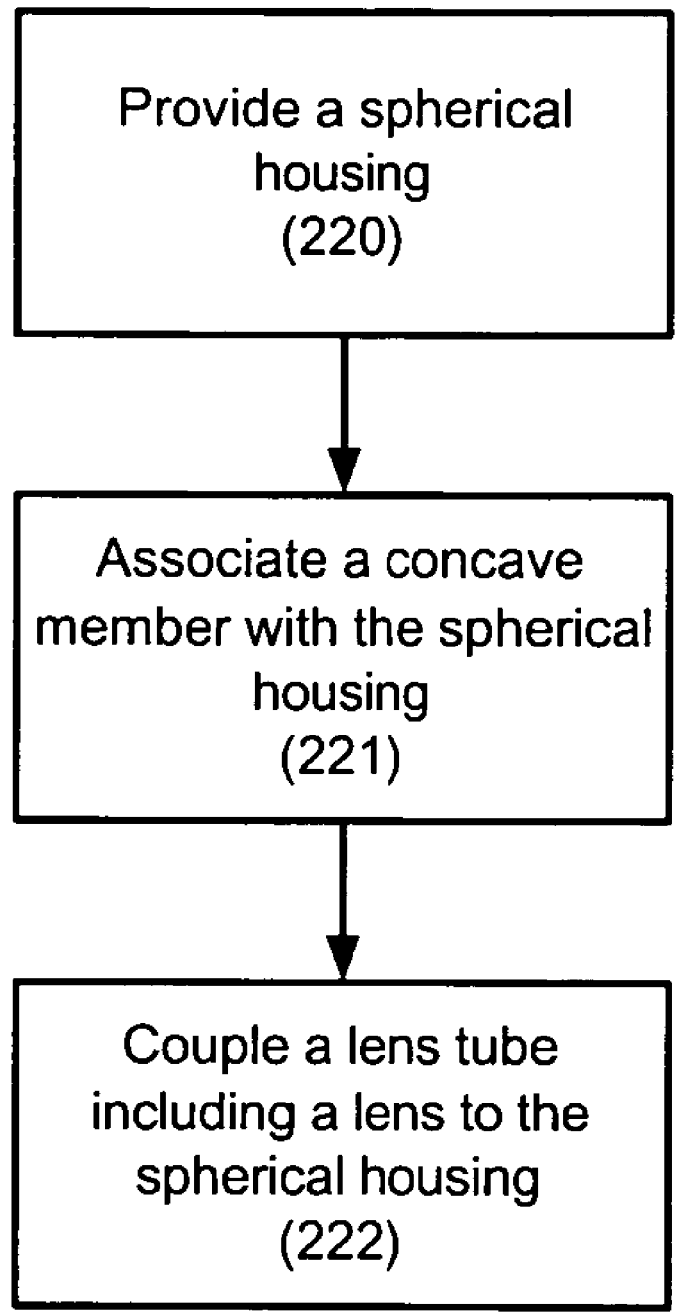
FIG. 12 is a flowchart illustrating an additional exemplary, but not exclusive, process of making a projector that is easily aimed according to one exemplary embodiment.

FIG. 12 is a flowchart illustrating an additional exemplary, but not exclusive, process of making a projector that is easily aimed, according to an alternative embodiment. First, a spherical housing is provided (step 220). The spherical housing houses circuitry that is used to generate an image that is to be displayed on a viewing surface. Next, a concave base is associated with the spherical housing (step 221). In one embodiment, the spherical housing is disposed in the concave base. A lens tube including a lens is also coupled to the spherical housing (step 222).

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A projector, comprising:
    a hemispherical housing for housing circuitry configured to generate an image, said housing including a flat bottom surface;
    a lens configured to focus and project said image; and
    a swivel base rotatably coupled to said flat bottom surface of said housing;
    wherein said lens is aimed in a horizontal plane by swiveling said housing on said swivel base; and
    wherein said hemispherical housing swivels on said swivel base about an axis that is normal to said bottom surface of said flat hemispherical housing and passes through a center of hemispherical housing.

2. The projector of claim 1, further comprising:
    a lens tube containing said lens;
    a lens track on said housing;
    wherein said lens tube is configured to slide manually along said lens track to vertically position said lens.

3. The projector of claim 2, wherein said lens tube is configured to translate along said lens track such that said lens can be vertically positioned at any angle between 0 and 90 degrees with respect to said swivel base.

4. The projector of claim 2, wherein said lens tube is configured to translate along said lens track such that said lens can be vertically positioned at any angle between 0 and 180 degrees with respect to said swivel base.

5. The projector of claim 2, wherein said translation of said lens tube along said lens track is motorized.

6. The projector of claim 1, wherein said swiveling of said housing is motorized.

7. The projector of claim 1, wherein said swivel base is configured to be coupled to a ceiling.

8. The projector of claim 1, further comprising a light source separate from said lens, said light source being disposed on an exterior of said housing so as to provide light around an area of said housing.

9. The projector of claim 1, further comprising a lens tube containing said lens, wherein said lens tube is coupled to said housing such that said lens tube swivels with respect to said housing.

10. The projector of claim 9, wherein said swivel base is configured to be coupled to a ceiling.

11. The projector of claim 9, wherein said swiveling of said lens tube is motorized.

12. The projector of claim 1, wherein said swivel base is coupled to a vertical stand having an adjustable height.

13. The projector of claim 1, further comprising an optical disc drive to play an optical disc.

14. The projector of claim 1, further comprising a lens cover for covering said lens when said lens is not in use.

15. The projector of claim 1, further comprising function controls disposed on said housing to control functions of said projector.

16. The projector of claim 1, wherein said housing is configured to swivel 360 degrees in said horizontal plane.

17. The projector of claim 1, wherein said image comprises a video image.

18. The projector of claim 1, wherein said image comprises a still image.

19. The projector of claim 1, further comprising a motor for moving said housing on said swivel base.

20. The projector of claim 1, further comprising a détente mechanism between said housing and said swivel base to inhibit movement of said housing with respect to said swivel base.

21. A method of making a projector, said method comprising:
    providing a hemispherical housing for housing circuitry configured to generate an image that is then projected through a lens, said housing including a flat bottom surface; and
    rotatably coupling a swivel base to said flat bottom surface of said housing,
    wherein said lens is aimed in a horizontal plane by swiveling said housing on said swivel base; and
    wherein said hemispherical housing swivels on said swivel base about an axis that is normal to said bottom surface of said hemispheric housing and passes through a center of said hemispherical housing.

22. The method of claim 21, further comprising:
    coupling a lens track to an exterior of said housing said lens track being curved to conform with the hemispherical shape of said housing; and
    coupling a lens tube containing a lens to said housing and said lens track.

23. The method of claim 22, further comprising configuring said lens tube to translate along said lens track.

24. The method of claim 22, further comprising configuring said lens tube and said housing to be controlled manually.

25. The method of claim 22, further comprising motorizing said lens tube to move with respect to said lens track.

26. The method of claim 22, further comprising motorizing said swivel base.

27. The method of claim 21, further comprising providing a détente mechanism to inhibit movement of said housing with respect to said swivel base until a minimum force is applied.

28. The method of claim 21, further comprising coupling said swivel base to a ceiling.

29. The method of claim 21, further comprising coupling a light source to an exterior of said housing.

30. The method of claim 21, further comprising:
    coupling a lens tube containing a lens to said housing; and
    configuring said lens tube to pivot with respect to said housing.

31. The method of claim 30, further comprising configuring said lens tube to be pivoted manually.

32. The method of claim 30, further comprising motorizing said lens tube to pivot with respect to said housing.

* * * * *